Patented Nov. 8, 1932

1,887,445

UNITED STATES PATENT OFFICE

CONWAY, BARON von GIRSEWALD, HANS WEIDMANN, AND GERHARD ROESNER, OF FRANKFORT-ON-THE-MAIN, GERMANY, ASSIGNORS TO AMERICAN LURGI CORPORATION, OF NEW YORK, N. Y., A CORPORATION OF NEW YORK

PROCESS FOR THE PRODUCTION OF TRIALKALI PHOSPHATES

No Drawing. Application filed March 25, 1931, Serial No. 525,326, and in Germany August 19, 1930.

This invention relates to a process for the production of trialkali phosphates, especially trisodium- or tripotassium phosphate, by causing metal-phosphorus compounds, such as ferro-phosphorus, to react with alkali metal compounds which have an alkaline reaction, such as sodium- or potassium oxide, hydroxide or carbonate, in a state of fusion.

It has already been proposed to decompose ferrophosphorus with sodium carbonate by running ferro-phosphorus, which has been melted in a cupola furnace, into a Bessemer converter provided with a rammed bottom of sodium carbonate.

This process could not be successfully carried out in practice, because, with the above described method of operating, it is impossible to avoid the violent and even explosive reaction phenomena—attended with overheating, loss of material and danger to the operatives—which occur when large quantities of highly heated fused ferro-phosphorus are brought into contact with the sodium carbonate.

It has been ascertained that a smooth, reliable and perfectly safe reaction between the reaction components, in a state of fusion, can be obtained by operating in such a way that, instead of the molten ferrophosphorus being allowed to act, in large quantity and all at once, on the sodium carbonate, at least one of the reaction components is introduced in the solid state, and that only small amounts of at least one of the components are allowed to act upon the other at a time. According to the present invention, this can be effected, for example by successively melting only comparatively small quantities of the mixed reaction components, or else by first melting the total amount, or greater part, of the one component—either the alkali carbonate or the ferro-phosphorus—in a converter for example, and then adding the other component in the solid state and in small quantities at a time. Alternatively, a certain restricted amount of one or both components may be melted in the first place, and further successive amounts of the individual components introduced (e. g. alternately) afterwards. In any event, the degree of fineness, or size, of the substances employed may vary within a wide range. In this manner, by regulating the rate of introduction, or the amount of the several additions, it is possible to keep the course of the highly exothermic reaction, at each time, within the desired limits, even in the case of ferro-phosphorus, which is very high in phosphorus (e. g. 25%), the employment of which, especially in presence of large amounts of silicon, renders the reaction extremely violent and dangerous.

In addition to the advantage of being able to moderate and control the course of the reaction, the hereindescribed method of operating presents the advantage over the known process that only a single melting apparatus is needed for carrying out the melting operation, whereas, in the known process, a converter is needed for melting the ferro-phosphorus, in addition to the apparatus for the actual reaction.

The reaction components can be melted in a great variety of furnaces or melting vessels, such as converters, crucibles or crucible furnaces or Brackelsberg furnaces, and also, with particular advantage in electrically heated furnaces of any kind, especially those in which the charge, being connected up as a resistance in the circuit, is directly traversed by the current.

Ferro-phosphorus may be replaced by other phosphides, such as copper phosphide, manganese phosphide and the like. Similarly, sodium carbonate may be replaced by other alkali carbonates, such as potassium carbonate, or other compounds with an alkaline reaction, such as oxides and hydroxides of the alkalis. Again, for example for the production of mixed phosphates, the compounds of two or more alkali metals may be employed conjointly.

It has also been found necessary, in the herein-described reaction to supply the amount of oxygen required to oxidize the phosphorus to phosphates—or to make up the deficiency in oxygen when alkali carbonates are employed—and also that, according to the amount of oxygen available, the reaction is enabled—for example in decomposing ferrophosphorus with sodium carbonate—to proceed in accordance with one or other of the following equations:

(1) $2Fe_2P + 3Na_2CO_3 + 4O_2 = 2Na_3PO_4 + 2Fe_2O_3 + 3CO$ (2) $2Fe_2P + 3Na_2CO_3 + O_2 = 2Na_3PO_4 + 4Fe + 3CO$

Thus, in accordance with the amount of oxygen employed, the process may be performed in such a way that the iron (or other metal combined with the phosphorus) is obtained as such, or as oxide. In this way, by conjointly employing the phosphorus compounds of different metals, alloys of such metals can be obtained as valuable by-products in the production of trialkali phosphates.

It has also transpired that the requisite oxygen—or the deficient oxygen when alkali carbonates are employed—can be supplied either in the gaseous form, according to the above Equations 1 and 2—for example as a blast of air (air enriched with oxygen) or a gas (such as carbon dioxide) which furnishes oxygen under the conditions of the reaction—for example, in known manner, through the tuyères of a converter in which the reaction is carried out, or in the form of an oxygen compound, such as ferric oxide or other metallic oxide, for example in accordance with the equations:

(3) $6Fe_2P + 9Na_2CO_3 + 2Fe_2O_3 = 6Na_3PO_4 + 16Fe + 9CO$ (4) $2Fe_2P + 3Na_2CO_3 + 2CuO = 2Na_3PO_4 + 4Fe + 2Cu + 3CO$

In this manner, as can be seen from Equation 4, it is also possible, by employing different metals, as carriers of phosphorus and oxygen, to obtain alloys of such metals as by-products in the preparation of the alkali phosphates. If desired, the oxygen may be supplied conjointly in the gaseous state and also in the form of oxygen compounds.

The temperature of the reaction should, as a rule, be so regulated that, when completed, both the resulting alkali phosphate and metallic oxide, or metal, are in a state of complete fusion, so that the two products can be separated, while still in a fluid state, by suitably tapping or tilting the converter, etc. Consequently, the temperatures to be maintained will vary according to the character of the products in each case.

When phosphides containing larger or smaller amounts of phosphorus than the $Fe_2P$ specified in the above equations are employed, the relative proportions suitable for the reaction will naturally differ, in a corresponding manner, from those given in the equations.

*Example 1*

110 kgs. of sodium carbonate are first fused at as low a temperature as possible in an electric furnace provided with twyers for the introduction of air into the melt, and then 100 kgs. of ferrophosphorus are introduced gradually in small portions whilst suitably reducing the heating current. During the melting process air is blown through the twyers into the melt in such limited quantities that no iron oxide is formed in the melt. When a sample of the metal separated out at the bottom of the melting chamber shows that the reaction has terminated, the residual iron is first tapped from the furnace and then the trisodium phosphate formed.

*Example 2*

A mixture of 100 kgs. of relatively finely ground ferrophosphorus with 130 kgs. of granulated potassium carbonate and 75 kgs. of iron oxide in the form of relatively finely ground cinders is introduced gradually in small portions into an electric furnace consisting of a melting chamber made of carbon and connected with one lead of a source of alternating current, and a graphite electrode adapted to be lowered into the melting chamber from above and connected to the other lead of the source of alternating current. After the current has been caused to pass through the furnace in any desired manner, for example, by lowering the graphite electrode into contact with the bottom of the crucible and the portions of the reaction mixture first introduced are molten, the graphite electrode can be raised so that the molten mass itself serves for conducting the current. After introducing a certain amount of the reaction mixture, the further heat required can be supplied wholly or mainly by the internal heat of the reaction process so that the supply of current can be reduced to a considerable extent. The iron practically free from phosphorus obtained at the bottom of the melting chamber in a reguline form can be separated in the manner set forth in Example 1 from the supernatant melt of tripotassium phosphate by tapping.

We claim:—

1. Process for the production of trialkali phosphates which comprises causing a metal-phosphorus compound to combine in a state of fusion with an alkali metal compound having an alkaline reaction, in presence of oxygen, one at least of the reaction components being introduced in the solid state and one at least of the components being in all cases, brought into reaction with the other in small quantities only at a time.

2. Process for the production of trialkali phosphates comprises causing ferrophosphorus to combine in a state of fusion, with an alkali metal compound having an alkaline reaction, in presence of oxygen, one at least of the reaction components being introduced in the solid state and one at least of the components being in all cases, brought into reaction with the other in small quantities only at a time.

3. Process for the production of trialkali phosphates which comprises causing a metal-phosphorus compound to combine in a state of fusion with an alkali metal compound having an alkaline reaction, in presence of oxygen, one at least of the reaction components being introduced in the solid state and one at least of the components being in all cases, brought into reaction with the other in small quantities only at a time, the oxygen required for oxidation of the phosphorus being added partly at least in the form of substances yielding oxygen under the conditions of the reaction.

4. Process for the production of trialkali phosphates which comprises causing a metal-phosphorus compound to combine in a state of fusion with an alkali metal compound having an alkaline reaction, in presence of oxygen, one at least of the reaction components being introduced in the solid state, and one at least of the components being in all cases brought into reaction with the other in small quantities only at a time, the oxygen required for the oxidation of the phosphorus being added partly at least in the form of metallic oxides.

5. Process for the production of trialkali phosphates which comprises causing a metal-phosphorus compound to combine in a state of fusion, with an alkali metal compound having an alkaline reaction, in presence of oxygen, one at least of the reaction components being introduced in the solid state and one at least of the components being in all cases, brought into reaction with the other in small quantities only at a time, the qauntity of the added oxygen being so adjusted that the metal of the metal phosphorus compound is deposited in the metallic state.

6. Process for the production of trialkali phosphates which comprises causing a metal-phosphorus compound to combine in a state of fusion with an alkali metal compound having an alkaline reaction, in presence of oxygen one at least of the reaction components being introduced in the solid state and one at least of the components being in all cases, brought into reaction with the other in small quantities only at a time, the quantity of the added oxygen being so adjusted that the metal of the metal phosphorus compound is deposited as oxide.

7. Process for the production of trialkali phosphates which comprises causing a metal-phosphorus compound to combine in a state of fusion, with an alkali metal compound having an alkaline reaction, in presence of oxygen one at least of the reaction components being introduced in the solid state and one at least of the components being in all cases, brought into reaction with the other in small quantities only at a time, the oxygen required for the oxidation of the phosphorus being added at least partly in the form of an oxygen compound of a metal other than that combined with the phosphorus of the metal phosphorus compound, the quantity of the added oxygen-containing metallic compound being regulated so that this metal is deposited partly at least with a portion at least of the metal of the metal phosphorus compound in the form of an alloy.

In testimony whereof, we affix our signatures.

CONWAY, BARON von GIRSEWALD.
HANS WEIDMANN.
GERHARD ROESNER.